April 18, 1967   L. E. DADIN   3,315,140
BATTERY CELL TESTER
Filed April 28, 1964
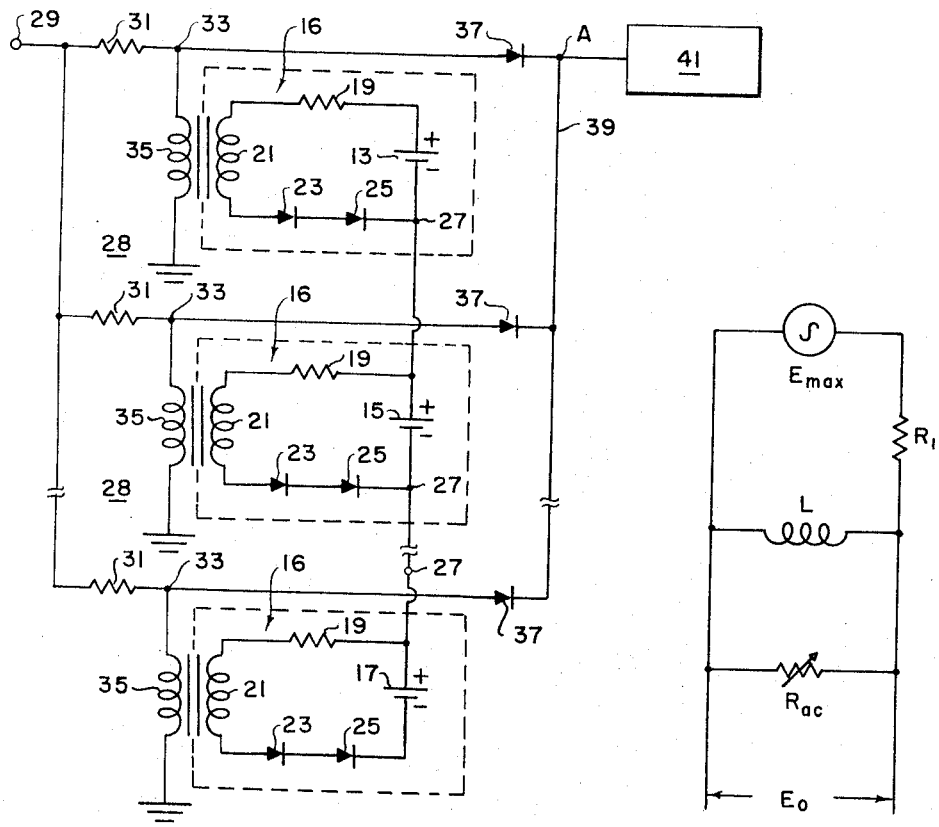
FIG. 1.
FIG. 2.
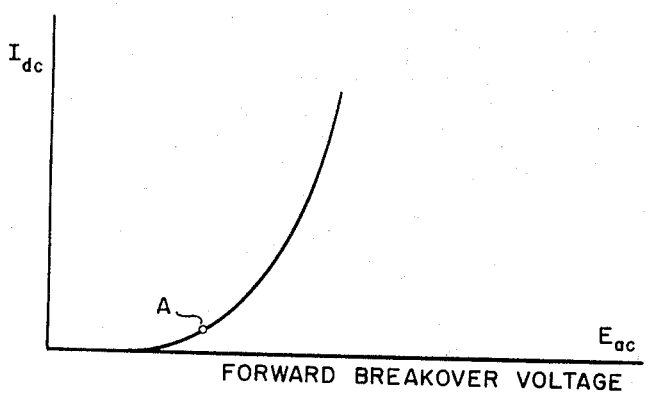
FORWARD BREAKOVER VOLTAGE
FIG. 3.
INVENTOR.
LOUIS E. DADIN
BY *O.E. Hodges* ATTY.
*Albert Hopp* AGENT

United States Patent Office 3,315,140
Patented Apr. 18, 1967

3,315,140
BATTERY CELL TESTER
Louis E. Dadin, Annapolis, Md., assignor to the United States of America as represented by the Secretary of the Navy
Filed Apr. 28, 1964, Ser. No. 363,308
13 Claims. (Cl. 320—48)

The invention described herein may be manufactured and used by or for the Government of the United States of America for governmental purposes without the payment of any royalties thereon or therefor.

This invention relates to a monitoring system for a multicelled battery, and more particularly, relates to an improved multicelled battery monitoring system for determining the voltage of a cell which has dropped to a predetermined level.

In the past, voltage of individual battery cells has in some instances been carried out by mechanical switching means which connects a sensing circuit to the individual cell. Such systems are unreliable insofar as moving parts carrying electrical currents are employed. In other instances, monitoring circuits have been employed without moving parts, but suffer from the disadvantage that there occurs during monitoring deleterious interaction between the cell being monitored and the other cells of the battery. Such systems typically employ comparisons between cells, and the cell being monitored is insufficiently isolated thereby causing the production of misleading and inaccurate cell voltage information. For example, in such prior art systems, if all cells decrease in voltage at the same time, the magnitude of output will occur at a monitored cell voltage considerably different than the output ought to be if the monitored cell alone were responsible for the output.

It is, therefore, among the objects of the present invention to provide an improved multicelled battery monitoring system wherein there are no moving parts; wherein there is no appreciable interaction between the cells being monitored and wherein improved monitoring circuit means provide for effective isolation of a deficient cell being monitored from other cells without incurring misleading monitoring output information.

Briefly stated, according to the invention there is connected across each of a plurality of series connected battery cells a circuit having non-linear resistance means such as diodes or the like. A direct current from the cell is passed through the non-linear resistance means and alternating current is coupled to the circuit via a transformer. The A.C. resistance of the non-linear resistance means changes radically for small changes in the direct current as the direct current approaches zero. This is seen by the transformer primary as a change in A.C. impedance reflected into the alternating current portion of the circuit, thus effecting a change in the A.C. voltage output thereof. Means are also provided for preventing the A.C. output from feeding back to ground via the transformer primaries of the circuits associated with the other cells.

Other advantages, features and objects of the present invention will become better understood by reference to the following detailed description and accompanying drawings, in which:

FIG. 1 is a view in schematic form of the monitoring system according to the invention;

FIG. 2 is a view of an equivalent circuit of a portion of the schematic of FIG. 1 for explanatory purposes; and FIG. 3 is a graph of the current and voltage characteristics of a circuit element employable with the invention.

Referring to FIG. 1, a multicelled battery 11 is shown having adjacent series connected cells 13 and 15, and a further series connected cell 17 representing the final one of the plurality of the adjacent cells of the battery 11. The cells 13 and 15 are connected in identical D.C. circuits, each of which is composed of a series loop 16 having resistance 19 connected to the positive plate of the cell, an inductance acting as a transformer secondary 21 connected to the other end of the resistance 19, and a pair of series-connected diodes 23 and 25, the anode of the first being connected to the inductance 21 and the cathode of the second diode 25 being connected to a junction point 27. The junction point 27 is connected to the negative plate of the cell 13 thus completing the loop 16, and to the positive plate of the adjacent cell, in this instance, of the cell 15.

The circuits and negative plates of the further adjacent cells of the battery 11 are connected at respective junction points 27 in the manner as above described, as indicated by the same reference numerals accorded to the further cell 17 and its associated circuit.

The alternating current side of each of the circuits, indicated generally by the reference numeral 28, receives from a square wave generator 29 alternating current pulses which are fed via a suitable input resistance 31 and a junction point 33 to a suitable grounded primary winding 35. The primary winding 35 carrying alternating current is inductively coupled to the winding 21 which carries direct current. Thus the windings 35 and 21 act as an input transformer, and the alternating current pulses from the generator 29 are fed to the alternating current side of the plurality of cell circuits 16 connected in parallel.

The output is taken in each instance from the junction point 33 and passed through an isolation diode 37 to a common output bus 39. The output may, for example, be fed to any suitable output means 41. As an example, the output may be fed to an input gate of a silicon controlled rectifier circuit providing an output signal of sufficient amplitude to operate a relay or other suitable indicating means.

In operation, referring to FIG. 2, there is shown the equivalent circuit for a single cell circuit 16 having a square wave generator with an output peak voltage $E_{max}$ driving a resistive load $R_1$ through a transformer. Resistive load $R_1$ represents a resistor 31 in series with the primary winding 35. L is the effective inductance of the transformer formed by windings 35, 21. $R_{ac}$ is the reflected A.C. resistance representing that of the resistor 19 and the diodes 23, 25. The equation for the output voltage $E_o$, as pointed out in Advanced Engineering Mathematics, C. R. Wylie, Jr., 1st edition, McGraw-Hill, pages 175–177, may be written as follows:

$$E = \frac{E_{max}R_{ac}}{R_1+R_{ac}} e^{-\left(\frac{R_1 R_{ac}}{R_1 L + R_{ac} L}\right)t} \quad [(\text{U}1t-a)-(\text{U}1t-2a)\ldots]$$

where $e$ is the base of the Naperian logarithms. The magnitude of the output voltage E is determined by the voltage divider term $$\frac{R_{ac}}{R_1+R_{ac}}$$

The cell voltage at which the proper voltage divider ratio $$\frac{R_{ac}}{R_1+R_{ac}}$$

occurs by varying the A.C. impedance of the resistor 19 and diodes 23 and 25.

FIG. 3 illustrates the forward characteristic of a single silicon diode, which, for example but not by way of limitation, may be employed as each of the diodes 23, 25. As indicated in FIG. 3, each diode will sustain about a certain voltage at point A before conduction in the forward direction occurs. When this voltage A is exceeded, the A.C. resistance of the diode changes from high to low. The forward conduction or breakover voltage characteristic curve may be varied by providing a suitable plurality N of such diodes in series, thus increasing the forward breakover voltage by a factor of N. Thus, once a suitable diode is selected, there is provided a recipe for controlling the cell voltage level at which the proper voltage divider ratio $$\frac{R_{ac}}{R_1+R_{ac}}$$

occurs and at which the diode A.C. resistance changes from high to lower values. Diodes of any suitable types or numbers N thereof may be employed.

From the graph of FIG. 3 it can be seen that a large increase in $R_{ac}$ occurs for small changes in the direct current $I_{dc}$ of the cell as the direct current approaches zero. This characteristic enables the cell voltage to closely approach the predetermined lower limit of the cell voltage before any output $E_o$ appears.

The output $E_o$ is produced by the rise in A.C. impedance as seen by the primary 35, brought about by the large increase of A.C. resistance of the resistor 19 and diodes 23 and 25 when changes occur in the direct current of one of the cells as said direct current approaches zero. Consequently, with this rise in A.C. impedance reflected into the primary winding 35, the voltage at the junction point 33 increases, thus effecting an output $E_o$.

The diodes 37 are selected to have sufficiently high breakover voltage in the backward direction to prevent the $E_o$ output in the output bus 39 from being fed back to ground thru the primary windings 35 of the other cells of battery 11. Therefore, the circuits associated with the other cells are effectively isolated from the output $E_o$ produced by at least one of the cells having a predetermined condition of low voltage.

It is appreciated that by the present invention there is provided a monitoring arrangement producing indication of a low voltage condition in at least one cell of a multicelled battery without deleterious interaction with the other cells of the battery. This arrangement is particularly advantageous as instrumentation for space vehicles, aircraft, submarines and obviously, has general utility as well.

If desired, identification of the particular cell having a low voltage condition can be provided in any suitable well-known manner, such as, for example, by multiplexing, i.e. by providing suitable electronic delay means such as multivibrators, a counter chain, LC elements, etc., between the pulse input leads of each respective pair of the battery cell circuits, and by employing a display CRT connected to the output bus 39, the face of the CRT being calibrated as to each successive cell location and the sweep of the CRT being synchronized with delay timing between successive monitoring circuits. Alternatively, a voltmeter may be employed in well-known fashion as a simple means of identifying the low voltage cell.

Obviously many modifications and variations of the present invention are possible in the light of the above teachings. It is therefore to be understood that within the scope of the appended claims the invention may be practiced otherwise than as specifically described.

What is claimed is:

1. Apparatus for testing a battery having a plurality of series connected cells, there being provided an output signal when at least one of the cells has a predetermined low voltage, comprising:
    means for indicating when a cell has low voltage comprising non-linear resistance means and first inductance means connected in circuit with each battery cell;
    a second inductance means coupled to each of said first inductance means;
    output means for receiving said indication of low voltage;
    each of said second inductance means being connected at one end to a reference potential and at the other end to a source of alternating current and to an output means;
    whereby when changes toward zero occur in the direct current of one of said cells, the alternating current impedance of that cell circuit increases, thereby causing a rise in the impedance seen by said second inductance means to effect a change in the magnitude of the alternating current waves appearing on said output means.

2. Apparatus according to claim 1 wherein said non-linear resistance means comprises at least one diode.

3. Apparatus according to claim 1 wherein the output means for each of said cells comprises means for isolating the output thereon from the other output means.

4. Apparatus according to claim 3 wherein said isolating means comprises at least one diode.

5. Apparatus for testing a battery having a plurality of series connected cells, there being provided an output signal when at least one of the cells has a predetermined low voltage, comprising:
    a conductive loop connected to each cell, said loop having non-linear resistance means the alternating current impedance of which changes when changes occur in the direct current output of the cell as said direct current approaches zero;
    a source of alternating current waves and, for each cell, an output means for conducting said indication of low voltage appearing in at least one of said cells having resistance means therefor connected to said source;
    means inductively coupling said source of alternating current via said resistance means with each of said conductive loops, said means also being connected to said output means;
    whereby said changes in the alternating current impedance occurring in said loop are reflected as impedance changes via said inductive coupling means to effect changes in the magnitude of the waves appearing on said output means.

6. Apparatus according to claim 5 but further characterized by each of said output means having connected therein one way valve means for isolating each output means from the other output means.

7. Apparatus according to claim 6 but further characterized by said non-linear resistance means comprising at least one diode and a resistance.

8. Apparatus for testing a battery having a plurality of series connected cells, there being provided an output signal when at least one of the cells has a predetermined low voltage, comprising:
    a conductive loop connected to each cell, said loop having non-linear resistance means the alternating current impedance of which changes when changes occur in the direct current output of the cell as said direct current approaches zero;
    a source of alternating current waves and, for each cell, an output means for conducting said indication of low voltage appearing in at least one of said cells having resistance means therefor connected to said source, said source being inductively coupled to said conductive loop;
    said resistance means and non-linear resistance means together establishing a voltage divider which may be proportioned with the characteristic value of said non-linear resistance means to establish a minimum cell voltage level at which the alternating current resistance of the loop changes from high to lower values;
    whereby at a predetermined minimum cell voltage changes in the alternating current impedance occurring in said loop are reflected as impedance changes via inductive coupling means to effect changes in the magnitude of the waves appearing in said output means.

9. Apparatus according to claim 8 wherein said source of alternating current is a square wave generator.

10. Apparatus according to claim 9 wherein said non-linear resistance means comprises at least one diode and a resistance.

11. Apparatus according to claim 10 wherein said output means comprises one-way valve means for isolating the output of any one output means from the other output means.

12. Apparatus according to claim 11 but further characterized by output utilization means connected to the isolated portion of each of said output means.

13. Apparatus for testing a battery, having a plurality of series connected cells, there being provided an output signal when at least one of the cells has a predetermined low voltage, comprising:

a conductive loop connected to each cell, said loop comprising a resistance connected to the positive sense plate of the cell, a first inductance connected to said resistance, and diode means connected at its cathode to said inductance and at its anode to the negative sense plate of the cell;

the resistance, inductance and diode means establishing non-linear resistance means the alternating current impedance of which changes when changes occur in the direct current output of the cell as said direct current approaches zero;

a source of square waves;

an output means for conducting said signal indication low voltage for each cell having a resistor, said resistor being connected to said source;

an output bus connected to all of said output means;

a second inductance connected to one end to a junction point between said resistor and the output means and at its other end to a point of reference potential, said second inductance being inductively coupled to said first inductance;

a diode connected to each output means for isolating each output path from the other output means;

whereby when changes toward zero occur in the direct current of one of said cells, the alternating current impedance of that cell circuit increases, thereby causing a rise in the impedance seen by said second inductance to effect a change in the magnitude of the alternating current waves appearing on said output means.

References Cited by the Examiner

UNITED STATES PATENTS

| | | | |
|---|---|---|---|
| 3,070,743 | 12/1962 | Harper | 323—66 |
| 3,176,210 | 3/1965 | Bethke | 320—40 |
| 3,189,788 | 6/1965 | Cody | 320—48 X |
| 3,234,538 | 2/1966 | Parke | 324—29.5 X |
| 3,247,441 | 4/1966 | Kimbleton | 320—12 |

JOHN F. COUCH, *Primary Examiner.*

S. WEINBERG, *Assistant Examiner.*